United States Patent
Evans

(10) Patent No.: US 10,521,281 B2
(45) Date of Patent: *Dec. 31, 2019

(54) SYSTEM AND METHODS FOR LAUNCHING AN APPLICATION ON AN ELECTRONIC DEVICE

(71) Applicant: BlackBerry Limited, Waterloo (CA)

(72) Inventor: Sean David Evans, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/295,239

(22) Filed: Mar. 7, 2019

(65) Prior Publication Data

US 2019/0205187 A1 Jul. 4, 2019

Related U.S. Application Data

(63) Continuation of application No. 14/653,098, filed as application No. PCT/CA2012/050905 on Dec. 17, 2012, now Pat. No. 10,275,293.

(51) Int. Cl.
*G06F 9/44* (2018.01)
*G06F 9/54* (2006.01)
(Continued)

(52) U.S. Cl.
CPC ............ *G06F 9/542* (2013.01); *G06F 9/445* (2013.01); *G06F 9/466* (2013.01); *H04L 67/142* (2013.01); *H04L 67/24* (2013.01)

(58) Field of Classification Search
None
See application file for complete search history.

(56) References Cited

U.S. PATENT DOCUMENTS

| 7,960,945 B1 * | 6/2011 | Onorato | G01R 31/382 320/132 |
| 2002/0094868 A1 * | 7/2002 | Tuck | G06Q 30/02 463/42 |

(Continued)

FOREIGN PATENT DOCUMENTS

WO   2014094107   6/2014

OTHER PUBLICATIONS

Communication under Rule 71(3) EPC for European App. No. 12890173.3 dated Mar. 19, 2019.

(Continued)

*Primary Examiner* — Shih-Wei Kraft
(74) *Attorney, Agent, or Firm* — Jeffrey N. Giunta; Fleit Intellectual Property Law

(57) ABSTRACT

A method and system to automatically load an application. Based on automatically generated statistics tracking proximities of application access and detected events, an application is selected with a greatest probability of being accessed within a time proximity of an event that is defined by operating environment criteria associated with launching the application. An association is determined, based on the statistics, between a user's launching of the application in proximity to a particular time of day over a plurality of days. In response to detecting an occurrence of the event and based on the association, the application is automatically loaded into a background of the device independent of a present user command to load the application. Based on loading the application and receiving an indication of user presence within a predetermined period of time after the occurrence of the event, the application is brought into a foreground of the device.

20 Claims, 9 Drawing Sheets

(51) Int. Cl.
  *G06F 9/445*  (2018.01)
  *H04L 29/08*  (2006.01)
  *G06F 9/46*  (2006.01)

(56) References Cited

U.S. PATENT DOCUMENTS

| | | | |
|---|---|---|---|
| 2005/0066283 A1* | 3/2005 | Kanamaru | G06F 9/445 715/749 |
| 2008/0005736 A1* | 1/2008 | Apacible | G06F 9/4843 718/100 |
| 2008/0160956 A1* | 7/2008 | Jackson | H04M 3/02 455/406 |
| 2009/0225026 A1 | 9/2009 | Sheba | |
| 2011/0306304 A1 | 12/2011 | Forutainpour et al. | |
| 2012/0214451 A1 | 8/2012 | Richardson et al. | |

OTHER PUBLICATIONS

International Preliminary Report on Patentability dated Jun. 23, 2015; received for PCT Application No. PCT/CA2012/050905; pp. 1-6.
Written Opinion of the International Searching Authority dated Sep. 9, 2013 in corresponding application No. PCT/CA2012/050905; pp. 1-8.
Extended European Search Report dated Jul. 21, 2016 received for European Application No. 12890173.3.
Extended European Search Report dated Oct. 21, 2019 received for European Application No. 19195089.8.

\* cited by examiner

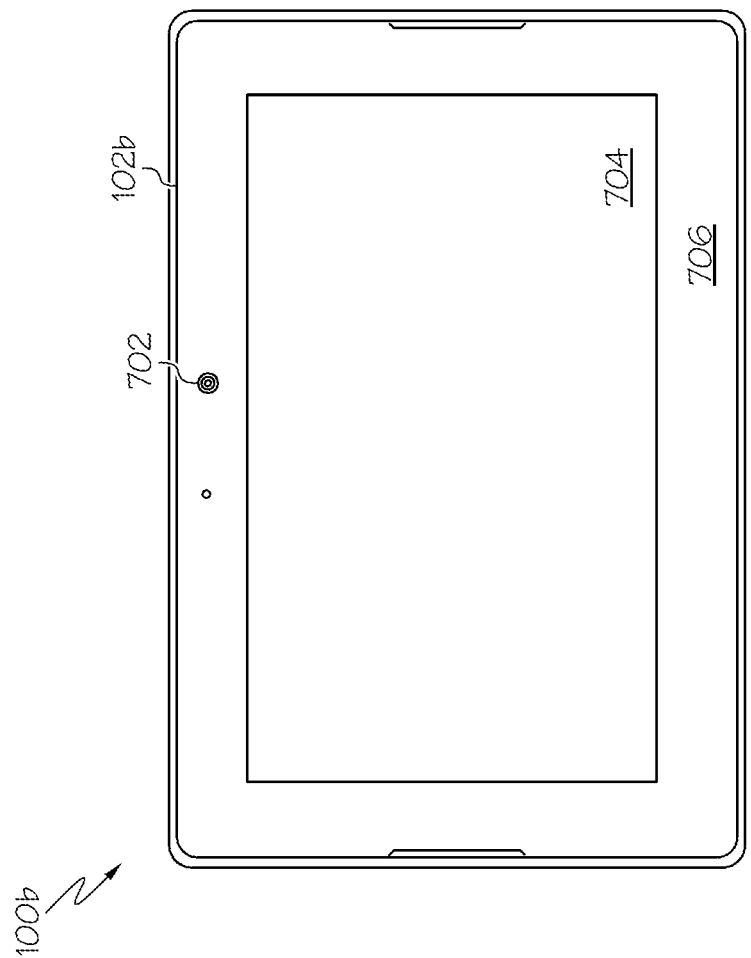
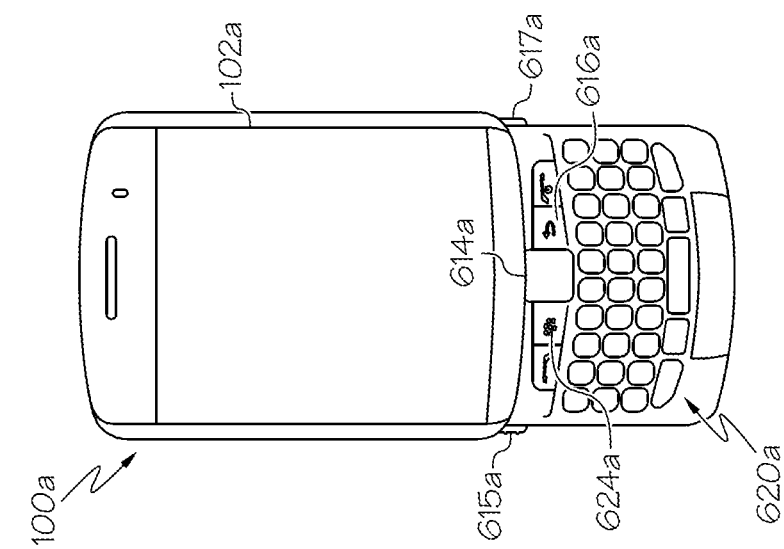

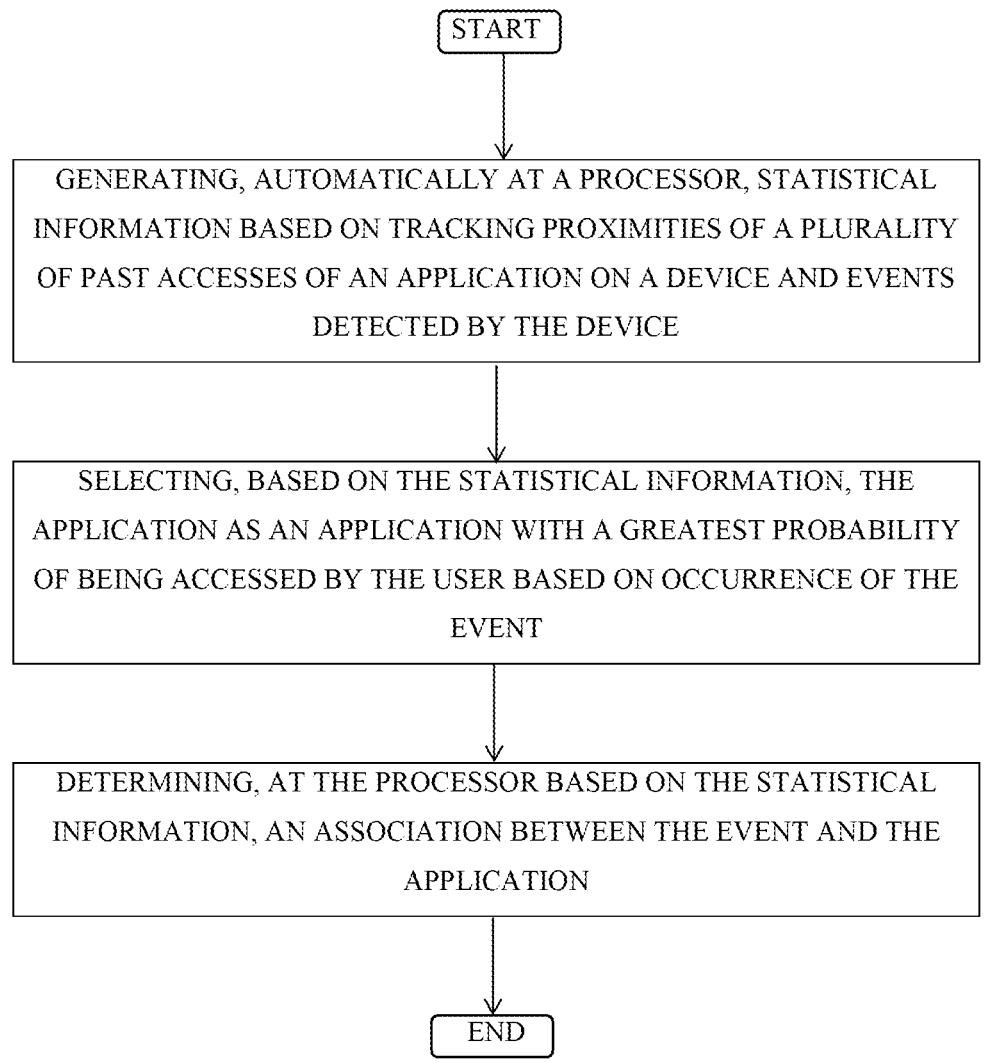
FIG. 10    1000

SYSTEM AND METHODS FOR LAUNCHING AN APPLICATION ON AN ELECTRONIC DEVICE

TECHNICAL FIELD

The following relates generally to launching an application on an electronic device.

DESCRIPTION OF THE RELATED ART

Many electronic devices, including mobile devices, can install and run a large selection of applications. For example, applications can include messaging applications for email and social networking websites, and informational applications for providing weather, traffic, news, etc. As more applications are installed on an electronic device, the user interface may organize the applications on multiple home screens or menus, such that a user may have to navigate through multiple screens or menu options in order to find the desired application to open. As a result, the user experience to locate and launch a desired application may be inconvenient and time consuming, especially if the desired application is used frequently by the user.

BRIEF DESCRIPTION OF THE DRAWINGS

Example embodiments will now be described making reference to the appended drawings wherein:

FIG. 5 is a plan view of an example electronic device.

FIG. 6 is a plan view of another example electronic device.

FIG. 10 is a flow diagram of example computer executable instructions for generating and processing statistical information on an electronic device.

DETAILED DESCRIPTION

Figure 1:
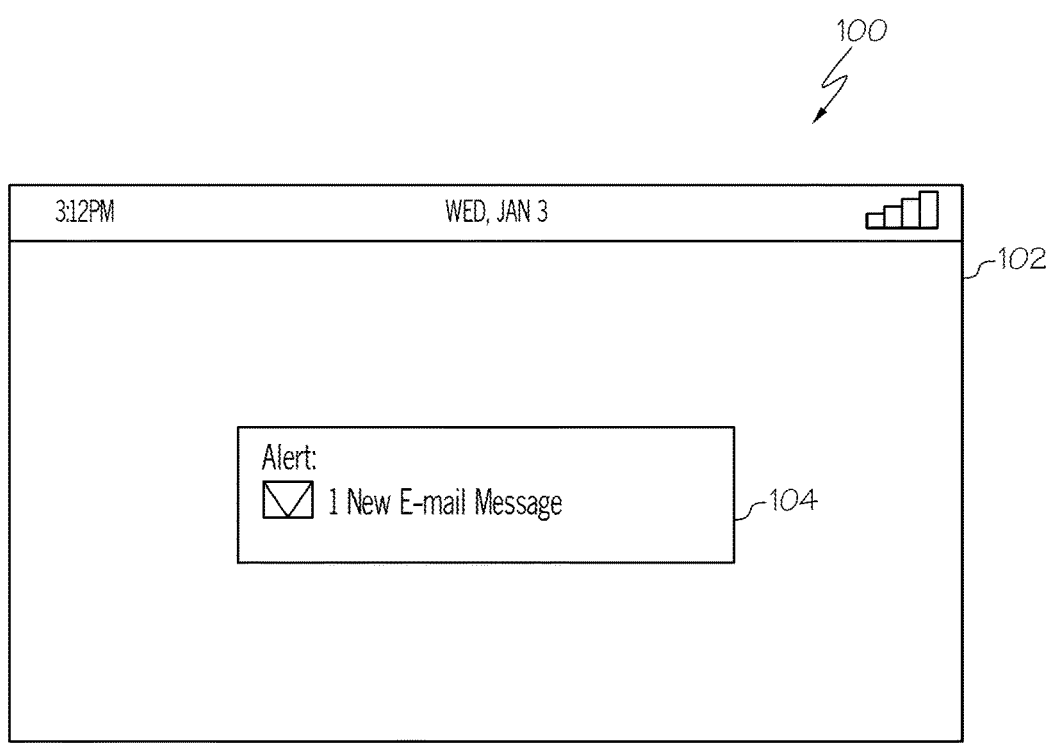
FIG. 1 is an example plan view of a display of an electronic device displaying a notification alert.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practised without these specific details. In other instances, well-known methods, procedures and components have not been described in detail so as not to obscure the example embodiments described herein. Also, the description is not to be considered as limiting the scope of the example embodiments described herein.

It has been recognized that it may be inconvenient and time consuming to locate and launch a desired application on an electronic device. To address this, the following describes a method, computer readable storage medium and electronic device operable to launch an application.

In an example, there is provided a method of operating an electronic device to launch an application. The method includes detecting an event associated with the application and, when an indicator of user presence is detected within a predetermined period of time after the event, launching the application. The method may further include loading the application in the background upon detecting the event if the application has not been loaded, wherein launching the application includes bringing the application to the foreground. The method may further include, when an indicator of user presence is not detected within the predetermined period of time after the event, closing the application loaded in the background.

In another example, there is provided a computer readable storage medium for launching an application on an electronic device. The computer readable storage medium includes computer executable instructions that when executed by a processor cause the processor to detect an event associated with the application and, when an indicator of user presence is detected within a predetermined period of time after the event, launch the application. The computer readable storage medium may include further computer executable instructions that when executed by a processor cause the processor to load the application in the background upon detecting the event if the application has not been loaded, wherein launching the application includes bringing the application to the foreground. The computer readable storage medium may include further computer executable instructions that when executed by a processor cause the processor to, when an indicator of user presence is not detected within the predetermined period of time after the event, close the application loaded in the background.

In another example, there is provided an electronic device to launch an application. The electronic device includes a processor configured to detect an event associated with the application and, when an indicator of user presence is detected within a predetermined period of time after the event, launch the application. The processor may be further configured to load the application in the background upon detecting the event if the application has not been loaded, wherein launching the application includes bringing the application to the foreground. The processor may be further configured to, when an indicator of user presence is not detected within the predetermined period of time after the event, close the application loaded in the background. The electronic device may include an accelerometer coupled to the processor.

For the method, computer readable storage medium, and electronic device, detecting the indicator of user presence may include detecting a motion of the electronic device. Detecting the motion of the electronic device may include detecting any one or more of a change in an accelerometer reading of the electronic device, removal of the electronic device from a holster, and a disconnection of the electronic device from a docking station or charger. The event may include any one or more of a notification alert of a message that can be accessed by the application, and an operating environment criterion such as a particular time of day.

For the method, computer readable storage medium, and electronic device, the event may be associated with the application based on statistical information generated from tracking proximity of an occurrence of the event and usage of the application, such as by selecting the application with the greatest probability of being accessed by a user, near the occurrence of the event.

In an example, the electronic device operates in a bedside mode and the event includes an alarm. Detecting the indicator of user presence may include detecting a user input to turn off the alarm.

Referring to FIG. 1, an example plan view of a display 102 of an electronic device 100 is provided. The display 102 of the electronic device 100 is displaying an example notification alert 104 of a new email message received by the electronic device 100. It will be appreciated that the notification alert 104 may take on other graphics, text, images, etc., as well as other forms of alerts such as audio alerts (e.g. sounds, alarms) and/or haptic alerts (e.g. vibrations), used alone or in combination therewith.

Figure 2:
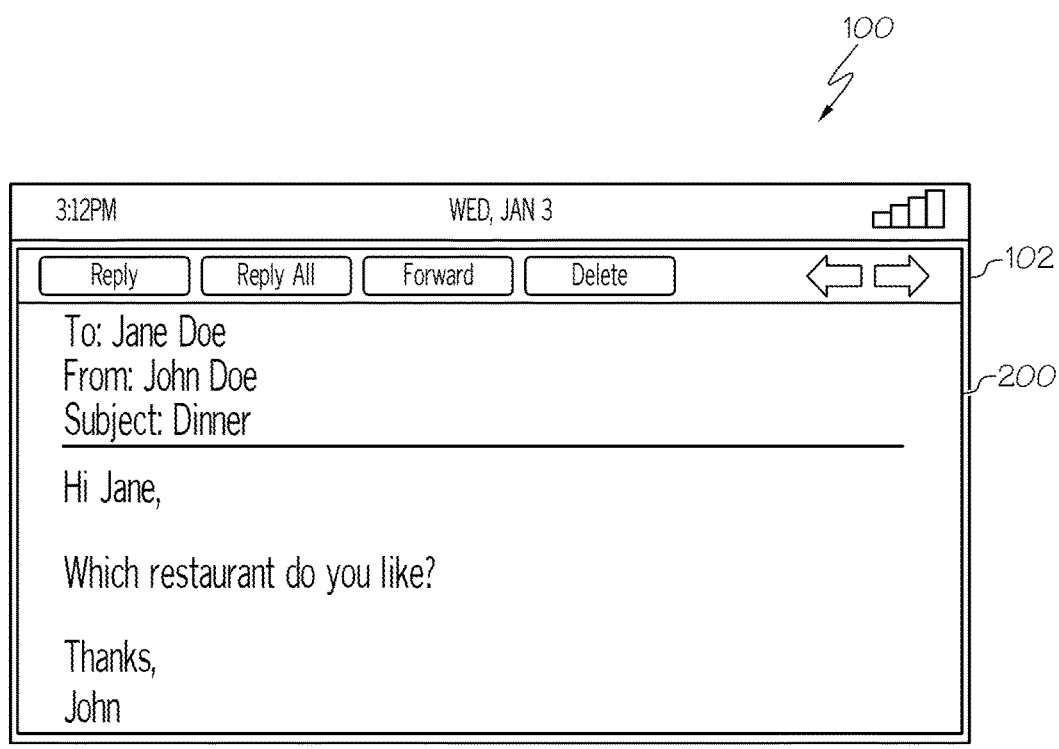
FIG. 2 is an example plan view of a display of an electronic device displaying an email viewer application.

In the example of FIG. 1, the electronic device 100 may be configured such that, if an indicator of a user presence is detected within a predetermined period of time after the notification alert 104 is displayed, the electronic device 100 may launch an email viewer application 200 which displays the email message that is the subject of the notification alert 104 (FIG. 2). An example of an indicator of user presence can be the lifting or raising of the electronic device 100 by a user so that the display 102 is more visible to the user. Such a lifting or raising motion of the electronic device 100 may be detected by a motion sensor of the electronic device 100, such as an accelerometer. If the motion of the electronic device 100 changes within a short period of time (e.g. 5 seconds) after the electronic device 100 displays the notification alert 104, it may suggest that the change in motion of the electronic device 100 is caused by the user's interest in the notification alert 104 and that the user will subsequently open the email viewer application 200 to view the underlying message of the notification alert 104. By configuring the electronic device 100 to automatically launch the email viewer application 200 upon detecting the change in motion of the electronic device 100, manually locating and launching the application is not needed by the user, thus saving the user time and effort.

It will be appreciated that the electronic device 100 can detect other events which are associated with one or more applications. In another example embodiment, a user may routinely wake up at around 7:30 am, and as part of the user's daily routine, check email, weather, and traffic shortly after awakening. In an example, the electronic device 100 can be configured to detect the time period 7:30 am, and if an indicator of user presence is detected within a predetermined period of time (e.g. 30 minutes) of 7:30a m, the electronic device 100 can launch an email viewer application, a weather application and a traffic application, which would have been manually launched by the user as part of his/her morning routine. In this example, the indicator of user presence can include detecting a motion of the electronic device 100 (which for example can indicate the user is awake and lifts the electronic device 100 for use), detecting an user input to turn off an alarm of the electronic device 100 (which for example can indicate the user is awake and will be using the electronic device 100 shortly) and/or detecting a disconnection of the electronic device from a docking station or charger (which for example can indicate the user is awake and is taking the device with him/her for use). By configuring the electronic device 100 to automatically launch multiple applications, manually locating and launching each application is not needed by the user, thus saving the user time and effort. By only launching the applications (e.g. email viewer, weather and traffic reporting applications, etc.) only when an indicator of the user presence is detected, the electronic device 100 can avoid unnecessarily launching applications, thus saving power and computational resources for other tasks.

It will be appreciated that an event can include a notification alert 104 and one or more operating environment criteria, such as a time of day or operating mode of the electronic device 100. For example, an event may be defined as a notification alert 104 that is received by the electronic device during a time when the user has a scheduled meeting, as indicated by a calendar/scheduling application running on the electronic device 100. During a meeting, a user may want the ability to quickly access new incoming messages without having to manually enter inputs (e.g. touch gestures, button presses, etc.) to the electronic device 100 to open the email viewer application 200. In an example, the user can simply move the electronic device 100 within a predetermined time period of receiving a notification alert 104 (e.g. a blinking LED on the housing of the electronic device 100) to cause the electronic device 100 to launch the email viewer application 200 and display the new message. Therefore, a user in a meeting can open and review a new message in response to a notification alert 104 by performing a discrete movement of the electronic device 100 (e.g. tilting the display 102 of an electronic device 100 towards him/her). It will be appreciated that an event associated with an application can be further defined by additional operating environment criteria so that the electronic device 100 can be configured to only launch an application under certain situations desired by the user.

Examples of applicable electronic devices may include, without limitation, cellular phones, smart-phones, tablet computers, wireless organizers, personal digital assistants, computers, laptops, handheld wireless communication devices, wirelessly enabled notebook computers, portable gaming devices, and the like. Such devices can be commonly referred to as mobile devices due to their portability. It will however be appreciated that the principles described herein are also suitable to other electronic devices, such as for example personal computers (PCs), tabletop computing devices, wall-mounted screens such as kiosks, or any other computing device.

The electronic device 100 may be a two-way communication device with advanced data communication capabilities including the capability to communicate with other electronic devices or computer systems through a network of transceiver stations. The electronic device may also have the capability to allow voice communication. Depending on the functionality provided by the electronic device, it may be referred to as a data messaging device, a two-way pager, a cellular telephone with data messaging capabilities, a wireless Internet appliance, or a data communication device (with or without telephony capabilities).

Figure 3:
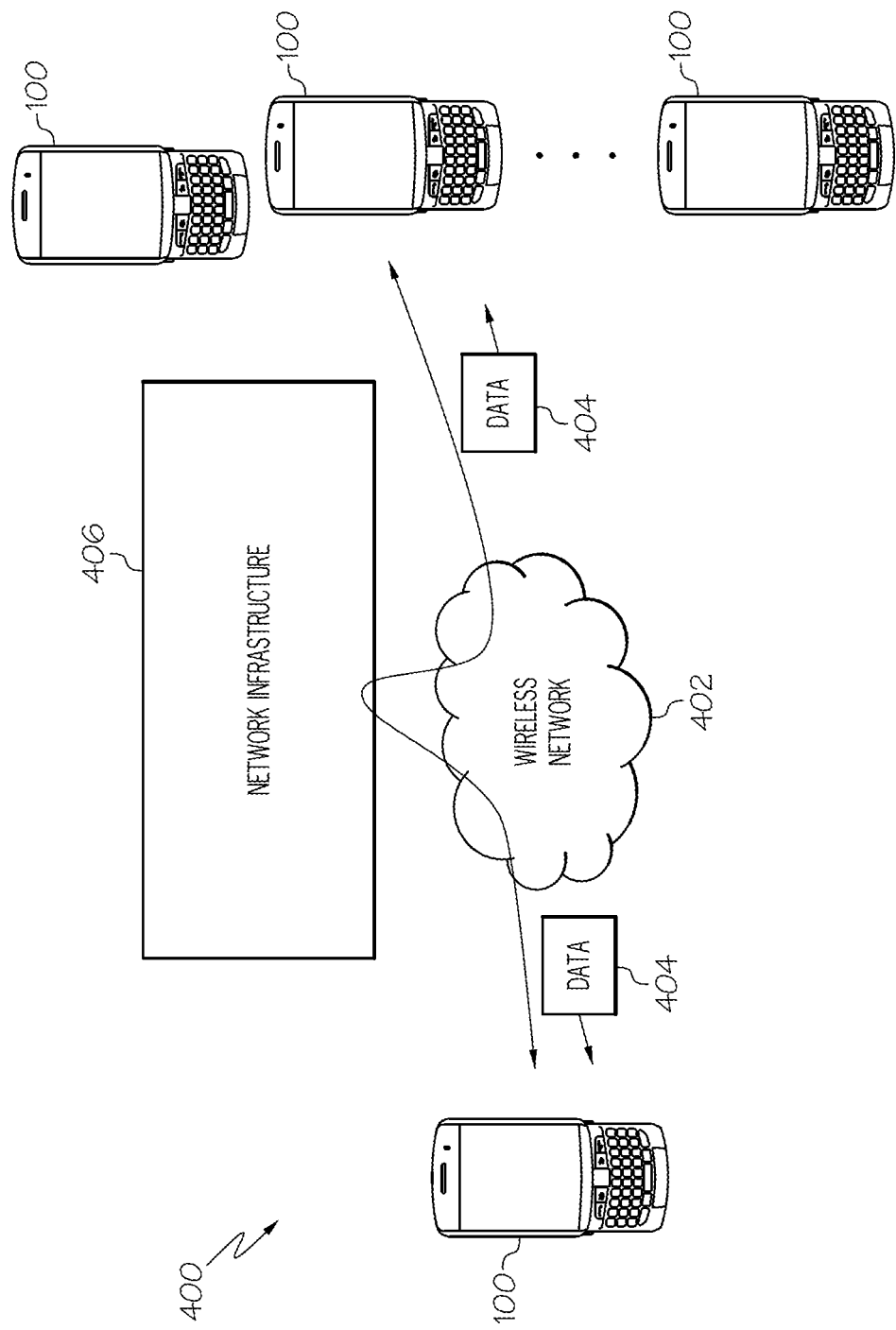
FIG. 3 is a block diagram of an example of a wireless communication system.

Referring to FIG. 3, an example communication system 400 is shown. The communication system 400, in this example, enables, at least in part, electronic devices 100 to communicate with each other via a wireless network 402. For example, as shown, data 404 may be exchanged between various electronic devices 100. Data 404 that is sent from one electronic device 100 to another electronic device 100 may be transmitted according to a particular messaging or communication medium, protocol, or other mechanism. For example, as shown in FIG. 3, data 404 may be sent over the wireless network 402 via a component of a network infrastructure 406. The network infrastructure 406 can include various systems that may be used by the electronic devices 100 to exchange data 404. For example, a peer-to-peer (P2P) system, a short message service centre (SMSC), an email system (e.g. web-based, enterprise based, or otherwise), a web system (e.g. hosting a website or web service), a host system (e.g. enterprise server), and social networking system may be provided by or within or be otherwise supported or facilitated by the network infrastructure 406. The electronic devices 100 may therefore send data to or receive data from other electronic devices 100 via one or more particular systems with which the electronic devices 100 are communicable via the wireless network 402 and network infrastructure 406.

Figure 4:
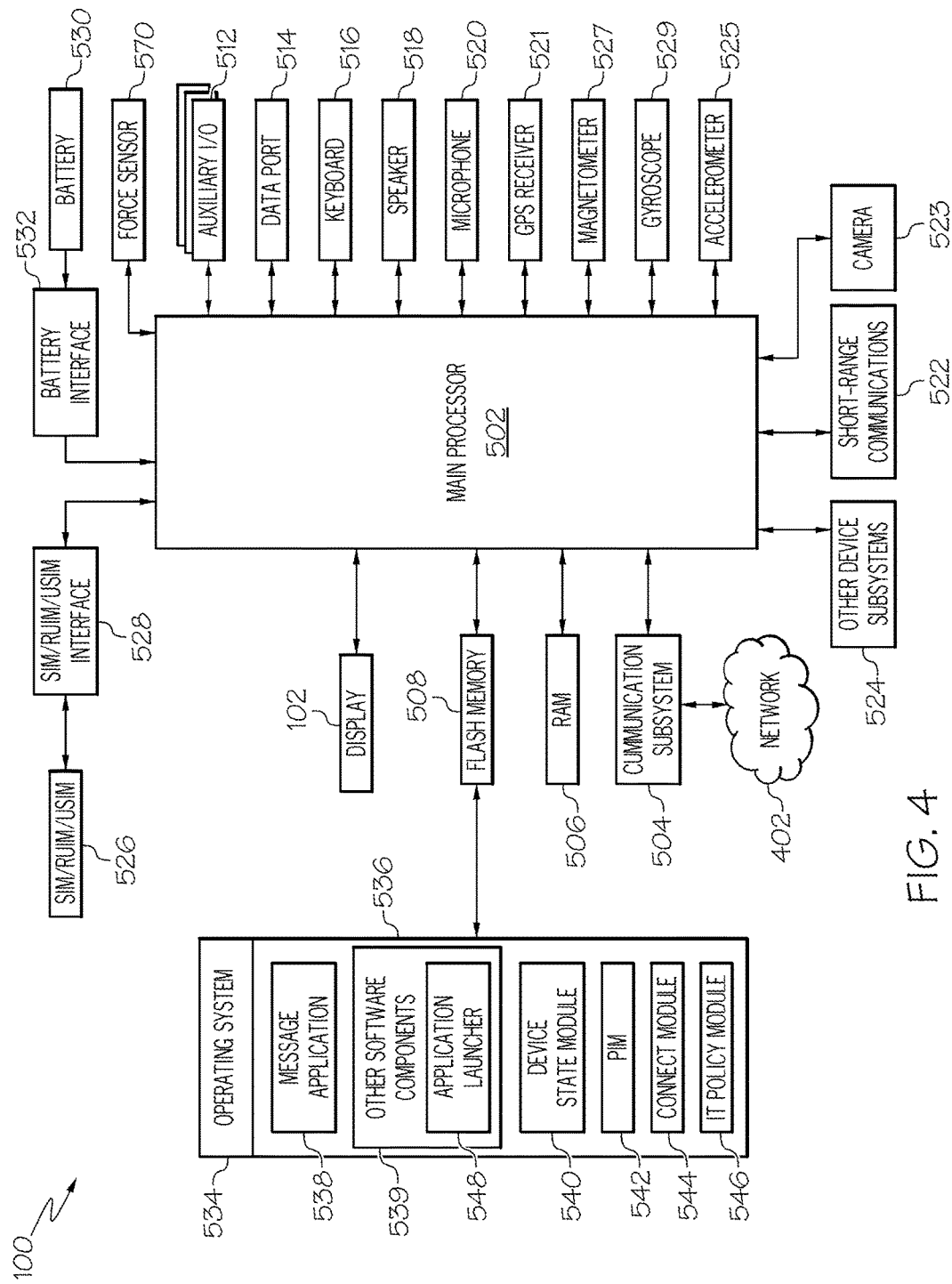
FIG. 4 is a block diagram of an example of an electronic device.

Referring to FIG. 4, a block diagram is provided to aid the reader in understanding an example configuration of an electronic device 100. The electronic device 100 includes a number of components such as a main processor 502 that controls the overall operation of the electronic device 100. Communication functions, including data and voice communications, are performed through a communication subsystem 504. The communication subsystem 504 receives messages from and sends messages to a wireless network 402. In this example of the electronic device 100, the communication subsystem 504 is configured in accordance with the Global System for Mobile Communication (GSM) and General Packet Radio Services (GPRS) standards, which is used worldwide. Other communication configurations that are equally applicable are the 3G and 4G networks such as Enhanced Data-rates for Global Evolution (EDGE), Universal Mobile Telecommunications System (UMTS) and High-Speed Downlink Packet Access (HSDPA), Long Term Evolution (LTE), Worldwide Interoperability for Microwave Access (Wi-Max), etc. New standards are still being defined, but it is believed that they will have similarities to the network behaviour described herein, and it will also be understood by persons skilled in the art that the example described herein are intended to use any other suitable standards that are developed in the future. The wireless link connecting the communication subsystem 504 with the wireless network 402 represents one or more different Radio Frequency (RF) channels, operating according to defined protocols specified for GSM/GPRS communications.

The main processor 502 also interacts with additional subsystems such as a Random Access Memory (RAM) 506, a flash memory 508, a touch-sensitive display 102, an auxiliary input/output (I/O) subsystem 512, a data port 514, a keyboard 516, a speaker 518, a microphone 520, a GPS receiver 521, short-range communications 522, a camera 523, a accelerometer 525, a gyroscope 529, a magnetometer 527 and other device subsystems 524. Some of the subsystems of the electronic device 100 perform communication-related functions, whereas other subsystems may provide "resident" or on-device functions. By way of example, the display 102 and the keyboard 516 may be used for both communication-related functions, such as entering a text message for transmission over the network 402, and device-resident functions such as a calculator or task list. In one example, the electronic device 100 can include a non touch-sensitive display in place of, or in addition to, the touch-sensitive display 102.

The electronic device 100 can send and receive communication signals over the wireless network 402 after required network registration or activation procedures have been completed. Network access is associated with a subscriber or user of the electronic device 100. To identify a subscriber, the electronic device 100 may use a subscriber module component or "smart card" 526, such as a Subscriber Identity Module (SIM), a Removable User Identity Module (RUIM) and a Universal Subscriber Identity Module (USIM). In the example shown, a SIM/RUIM/USIM 526 is to be inserted into a SIM/RUIM/USIM interface 528 in order to communicate with a network. Without the component 526, the electronic device 100 is not fully operational for communication with the wireless network 402. Once the SIM/RUIM/USIM 526 is inserted into the SIM/RUIM/USIM interface 528, it is coupled to the main processor 502.

The electronic device 100 is typically a battery-powered device and includes a battery interface 532 for receiving one or more rechargeable batteries 530. In at least some examples, the battery 530 can be a smart battery with an embedded microprocessor. The battery interface 532 is coupled to a regulator (not shown), which assists the battery 530 in providing power to the electronic device 100. Although current technology makes use of a battery, future technologies such as micro fuel cells may provide the power to the electronic device 100.

The electronic device 100 also includes an operating system 534 and software components 536 to 548 which are described in more detail below. The operating system 534 and the software components 536 to 548 that are executed by the main processor 502 are typically stored in a persistent store such as the flash memory 508, which may alternatively be a read-only memory (ROM) or similar storage element (not shown). Those skilled in the art will appreciate that portions of the operating system 534 and the software components 536 to 548, such as specific device applications, or parts thereof, may be temporarily loaded into a volatile store such as the RAM 506. Other software components can also be included, as is well known to those skilled in the art.

The subset of software applications 536 that control basic device operations, including data and voice communication applications, may be installed on the electronic device 100 during its manufacture. Software applications may include a message application 538, a device state module 540, a Personal Information Manager (PIM) 542, a connect module 544 and an IT policy module 546. A message application 538 can be any suitable software program that allows a user of the electronic device 100 to send and receive electronic messages, wherein messages are typically stored in the flash memory 508 of the electronic device 100. A device state module 540 provides persistence, i.e. the device state module 540 ensures that important device data is stored in persistent memory, such as the flash memory 508, so that the data is not lost when the electronic device 100 is turned off or loses power. A PIM 542 includes functionality for organizing and managing data items of interest to the user, such as, but not limited to, email, contacts, calendar events, and voice mails, and may interact with the wireless network 402. A connect module 544 implements the communication protocols that are required for the electronic device 100 to communicate with the wireless infrastructure and any host system, such as an enterprise system, that the electronic device 100 is authorized to interface with. An IT policy module 546 receives IT policy data that encodes the IT policy, and may be responsible for organizing and securing rules such as the "Set Maximum Password Attempts" IT policy.

Other types of software applications or components 539 can also be installed on the electronic device 100, such as an application launcher 548. These software applications 539 can be pre-installed applications or third party applications, which are added after the manufacture of the electronic device 100. Examples of third party applications include games, calculators, utilities, etc.

The additional applications 539 can be loaded onto the electronic device 100 through at least one of the wireless network 402, the auxiliary I/O subsystem 512, the data port 514, the short-range communications subsystem 522, or any other suitable device subsystem 524.

The data port 514 can be any suitable port that enables data communication between the electronic device 100 and another computing device. The data port 514 can be a serial or a parallel port. In some instances, the data port 514 can be a USB port that includes data lines for data transfer and a supply line that can provide a charging current to charge the battery 530 of the electronic device 100.

For voice communications, received signals are output to the speaker 518, and signals for transmission are generated by the microphone 520. Although voice or audio signal output is accomplished primarily through the speaker 518, the display 102 can also be used to provide additional information such as the identity of a calling party, duration of a voice call, or other voice call related information.

Referring to FIGS. 5 and 6, one example of an electronic device 100a is shown in FIG. 5 and another example of an electronic device 100b is shown in FIG. 6. It will be appreciated that the numeral "100" will hereinafter refer to any electronic device 100, including the examples 100a and 100b, those examples enumerated above or otherwise. It will also be appreciated that a similar numbering convention may be used for other general features common between all figures.

The electronic device 100a shown in FIG. 5 includes a touch-sensitive display 102a and a cursor or positioning device, which in this example is in the form of a trackpad 614a. The trackpad 614a permits multi-directional positioning of a selection indicator or cursor that can be displayed on the touch-sensitive display 102a such that the selection cursor can be moved in an upward, downward, left and right direction, and if desired and/or permitted, in any diagonal direction. A selection cursor may include a box, alteration of an icon or any combination of features that enable the user to identify the currently chosen icon or item. The trackpad 614a in this example is situated on the front face of a housing for electronic device 100a to enable a user to maneuver the trackpad 614a while holding the electronic device 100a in one hand. The trackpad 614a may serve as another input member (in addition to a directional or positioning member) to provide selection inputs to a processor of the electronic device and can preferably be pressed in a direction towards the housing of the electronic device 100a to provide such a selection input. It will be appreciated that the trackpad 614a is only one example of a suitable positioning device. For example, a trackball, touch-sensitive display, OLED, or other input mechanism may equally apply.

The electronic device 100a in FIG. 5 also includes a programmable convenience button 615a to activate a selection application such as, for example, a calendar or calculator. Further, electronic device 100a also includes an escape or cancel button 616a, a camera button 617a, a menu or option button 624a and a keyboard 620a. The camera button 617a is able to activate photo and video capturing functions, e.g. when pressed in a direction towards the housing. The menu or option button 624a can be used to load a menu or list of options on the display 102 when pressed. In this example, the escape or cancel button 616a, the menu option button 624a, and a keyboard 620a are disposed on the front face of the electronic device housing, while the convenience button 615a and camera button 617a are disposed at the side of the housing. This button placement enables a user to operate these buttons while holding the electronic device 100a in one hand. The keyboard 620a is, in this example, a standard QWERTY keyboard, however, it will be appreciated that reduced QWERTY or virtual keyboards (e.g. as provided by a touch-sensitive display) may equally apply It will be appreciated that for the electronic device 100, a wide range of one or more positioning or cursor/view positioning mechanisms such as a touch/track pad, a positioning wheel, a joystick button, a mouse, a touch-sensitive display, a set of arrow keys, a tablet, an accelerometer (for sensing orientation and/or movements of the electronic device 100 etc.), OLED, or other whether presently known or unknown may be employed. Similarly, any variation of keyboard 620a may be used. It will also be appreciated that the electronic devices 100 shown in FIGS. 5 and 6 are for illustrative purposes only and various other electronic devices 100 are equally applicable to the following examples. Other buttons may also be disposed on the electronic device housing such as colour coded "Answer" and "Ignore" buttons to be used in telephonic communications.

A front view of an example of the electronic device 100b is shown in FIG. 6. The electronic device 100b includes a touch-sensitive display 102b and a front camera 702. The touch-sensitive display 102b includes a touch-sensitive display area 704 and a touch-sensitive non-display area 706. The touch-sensitive display area 704 serves as the position device to provide an input mechanism in addition to display capabilities. The touch-sensitive non-display area 706 provides a further input mechanism, for example, to control menu options of the electronic device 100b Referring to FIG. 7, an example of a configuration for an application launcher 548 is provided. The application launcher 548 can be one of the other software applications 539 of FIG. 4 that can be loaded on the electronic device 100 or can be incorporated in another application (e.g. part of a message application 538). The application launcher 548 can request details of activity occurring in, or receive inputs from, one or more other software applications 539 (e.g. a message notification application 801), a component that can provide operating environment information (e.g. operating system 534) and a component that can provide an indicator of user presence (e.g. accelerometer 525 to detect motion). The application launcher 548 includes an event detector 800 for detecting an event, an association module 802 for determining at least one application associated with the event and an association storage 804 for storing such information, a user presence detector 806 for detecting an indicator of user presence, and a launching module 808 for launching an application associated with the event. The application launcher 548 can optionally include a tracking module 810 to determine the association between an event and an application based on statistical information generated from tracking activity of the user of the electronic device 100.

The event detector 800 detects an event that is associated with an application. In the example of FIG. 1, the event can be a notification alert 104 generated from a notification application 801. The notification application 801 can be part of a messaging application 538 that includes the email viewer application 200, or the notification application 801 may be a stand-alone application for a remote messaging service, such as an online email provider, or social networking website. It will be appreciated that the subject of a notification alert can be a new message (e.g. email, text/SMS message, instant messaging, social networking service), phone call, calendar appointment, status of the electronic device 100 (e.g. low battery) or any other information accessible to the electronic device 100. In another example, the event can be one or more operating environment criterion that can be determined by the electronic device 100, such as a specific time of day or a mode of operation of the electronic device 100.

The association module 802 determines at least one application that is associated with the event detected by the event detector 800 and stores such information in the association storage 804. In an example, the association module 802 may access a look-up table, stored in the association storage 804, by event to determine the associated application. For example, a notification alert 104 can be associated with the message application 538, such as the email viewer application 200 that is capable of viewing the message that is the subject of the notification alert 104. In another example, the application may be a web browser directed to an online email provider or social networking website that can access the message that is the subject of the notification alert 104.

In an example embodiment, the association module 804 can use a tracking module 810 to determine the application that is associated with an event. The tracking module 810 can track the activity of a user of the electronic device 100, such as the usage of an application in close proximity to an occurrence of an event, and can obtain statistical information regarding the event. The tracking module 810 can then determine the application associated with an event by selecting the application with the greatest probability of being accessed by the user after the occurrence of the event, based on the statistical information. FIG. 10 illustrates an example processing flow for such generating and processing of statistical information as can be performed by the tracking module 810. For example, a user may routinely access the email viewer application 200 in response to receiving a notification alert 104 such that the tracking module 800 subsequently associates a notification alert 104 with the email viewer application 200.

The user presence detector 806 detects an indicator of user presence by requesting details of activity occurring in, or by receiving inputs from, other components that can be used to detect or suggest a presence of a user of the electronic device 100. For example, motion of the electronic device 100 can suggest that a user is physically near the electronic device 100 in order for the user to move it. If the motion follows closely after the event, the motion may be caused in response to the user's interest in the event. In the example configuration of FIG. 7, the user presence detector 806 detects changes in the readings of an accelerometer 525 of the electronic device 100 to determine whether a user presence is detected. In an example, any change in the accelerometer reading can be interpreted by the user presence detector 806 as indicating a user presence. In another example, the user presence detector 806 may be configured to only recognize certain accelerometer reading changes as indicating a user presence, such as a change that would result from a user lifting the electronic device 100.

It will be appreciated that other indicators of motion of the electronic device 100 may be used, such as changes in other sensor readings (e.g. magnetometer 527, gyroscope 529, etc.) or other inputs (e.g. data port 514 connections, video or images captured by the camera 523, etc.). In an example, the user presence detector 806 can detect the removal of the electronic device 100 from a holster by detecting the removal of the magnetic influence of the holster using the magnetometer 527. In another example, the user presence detector 806 can detect the disconnection of the electronic device 100 from a docking station or charger by monitoring the data port 514 that is used to connect the electronic device 100 to the docking station or charger.

It will also be appreciated that other indicators of user presence can be detected by the user presence detector 806 that do not necessarily involve or suggest movement of the electronic device 100. For example, a user input, such as a key stroke, touch gesture, voice command, button press, or other form of input that can be detected by the electronic device 100 can be used to indicate a user presence. If the user input follows closely after the event, the user input may be caused in response to the user's interest in the event. In an example of an electronic device 100 operating in a bedside mode and outputting an alarm, the user presence detector 806 can detect a user input to turn off the alarm as indicating a user presence.

The launching module 808 launches the application(s) that is/are associated with the event detected by the event detector 800, if an indicator of user presence is detected by the user presence detector 806 within a predetermined period of time after the event. The launching module 808 can obtain the application to be launched from the association module 802. In an example, if the application is not running on the electronic device 100, the launching module 808 can load the application directly to the foreground of the electronic device 100. If the application is already running on the electronic device 100, the launching module 808 can simply bring the application to the foreground.

In another example embodiment, upon detection of an event by the event detector 800, if the application associated with the event is not already running the launching module 808 can load the application associated with the detected event in the background. If an indicator of user presence is detected within a predetermined period of time after the event, the launching module 808 can then bring the application to the foreground. Loading the application in the background prior to detecting an indicator of user presence enables the electronic device 100 to start loading the application sooner, thus reducing the wait time for the user. If an indicator of user presence is not detected within the predetermined period of time after detecting the event, the launching module 808 can close the application that has been loaded in the background.

It will be appreciated that any module, application or component exemplified herein that executes instructions or operations, such as the application launcher 548, may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data, except transitory propagating signals per se. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the electronic device 100 or accessible or connectable thereto. Any application or module herein described may be implemented using computer readable/executable instructions or operations that may be stored or otherwise held by such computer readable media.

Figure 8:
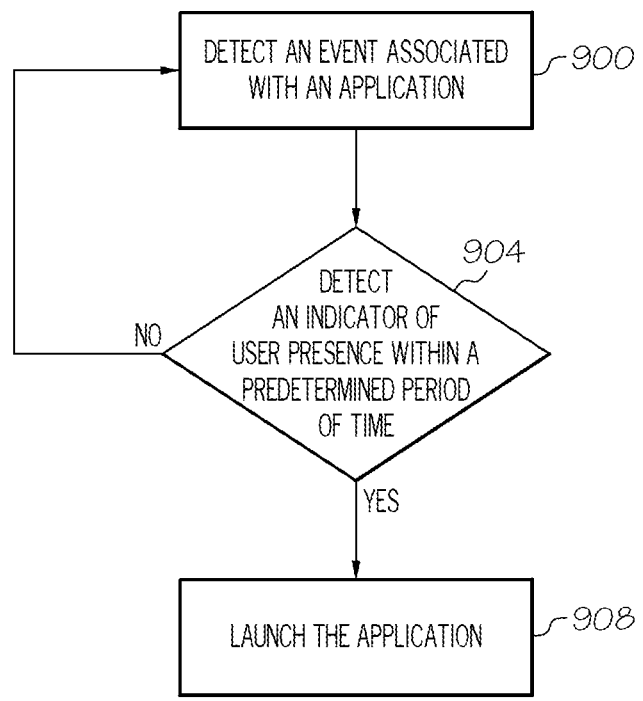
FIG. 8 is a flow diagram of example computer executable instructions for launching an application on an electronic device.

Referring to FIG. 8, an example set of computer executable and/or processor implemented instructions is provided for launching an application associated with an event, on an electronic device 100. At 900, an event associated with at least one application is detected. At 904, if an indicator of user presence is detected within a predetermined period of time, then the application will be launched at 908. Otherwise, the instructions can be repeated, starting back at 900.

Figure 7:
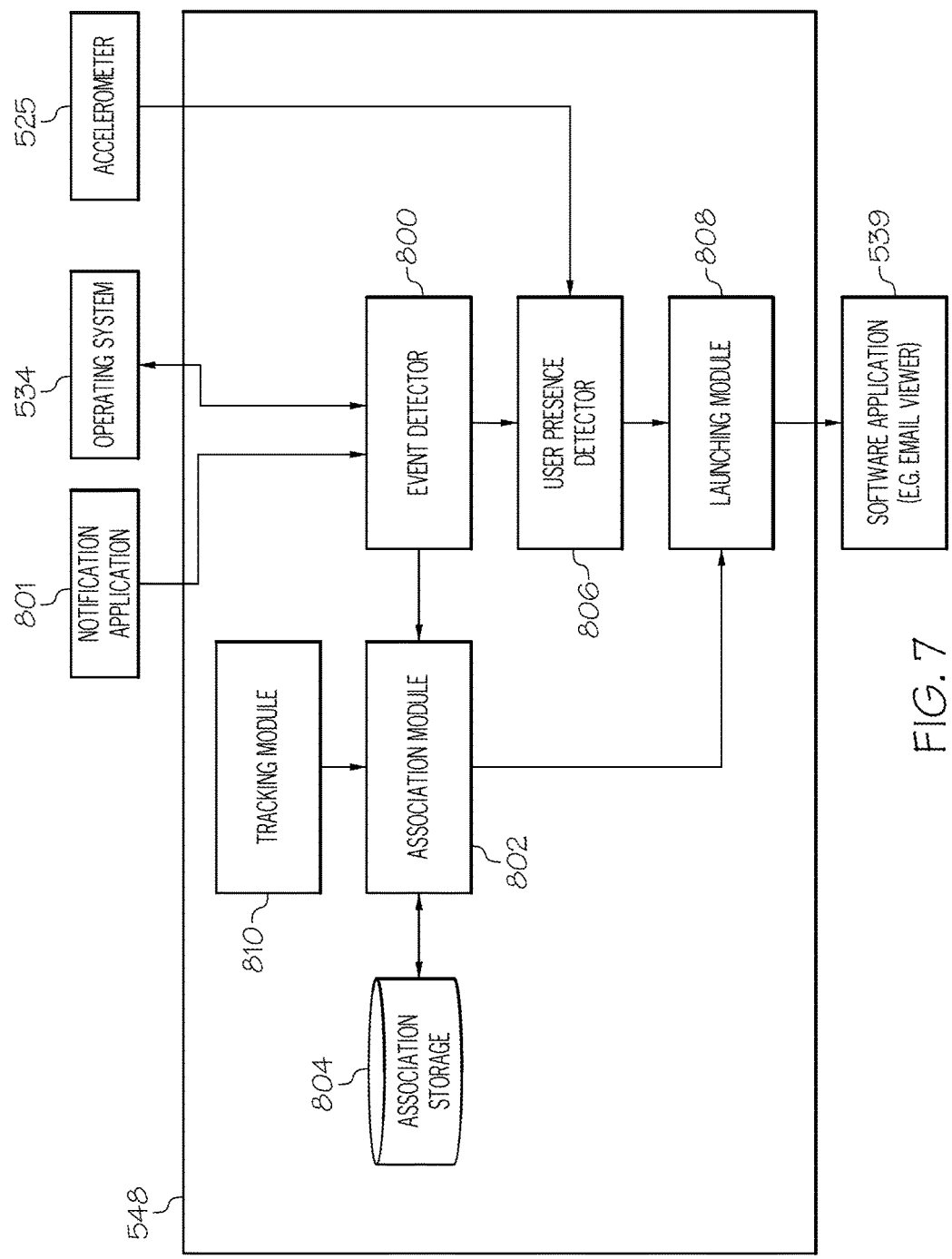
FIG. 7 is a block diagram of an example configuration of an application launcher.

As noted above, at 900, an event associated with at least one application is detected. In an example configuration of the application launcher 548, the event detector 800 may implement 900 (FIG. 7). Referring back to the example of FIG. 1, the event can be a notification alert 104. In another example, the event can be one or more operating environment criteria, such as a specific time of day and/or operating mode of the electronic device 100. In another example, the event can be a combination of an notification alert 104 and one or more operating environment criteria.

At 904, a determination is made as to whether an indicator of user presence is detected within a predetermined period of time after the event. In an example configuration of the application launcher 548, the user presence detector 806 may implement 900 (FIG. 7). Detection of an indicator of user presence after the predetermined period of time can increase the likelihood that the indicator of user presence is not indicative of the user's interest in the event. It will be appreciated that the predetermined period of time can depend on the type and nature of the event, and/or the application associated with the event. For example, a notification alert 104 of a new email message may be associated with a predetermined period of time of 5 to 10 seconds in which detection of an indicator of user presence will launch the email viewer application 200.

In another example, the predetermined period of time may be much longer, for example 30 minutes, for an event corresponding to the time of day that the user wakes up in the morning. In this example, there is a greater likelihood that an indicator of user presence detected within 30 minutes of the scheduled wake up of the user is still part of the user's morning routine, and thus, the user would want to launch the applications on the electronic device 100 that are part of his/her morning routine (e.g. email viewer application 200, weather, news, traffic, etc.).

At 908, if an indicator of user presence is detected within a predetermined period of time after the event, the applications associated with the event are launched. In an example configuration of the application launcher 548, the launching module 808 may implement 908 (FIG. 7).

Figure 9:
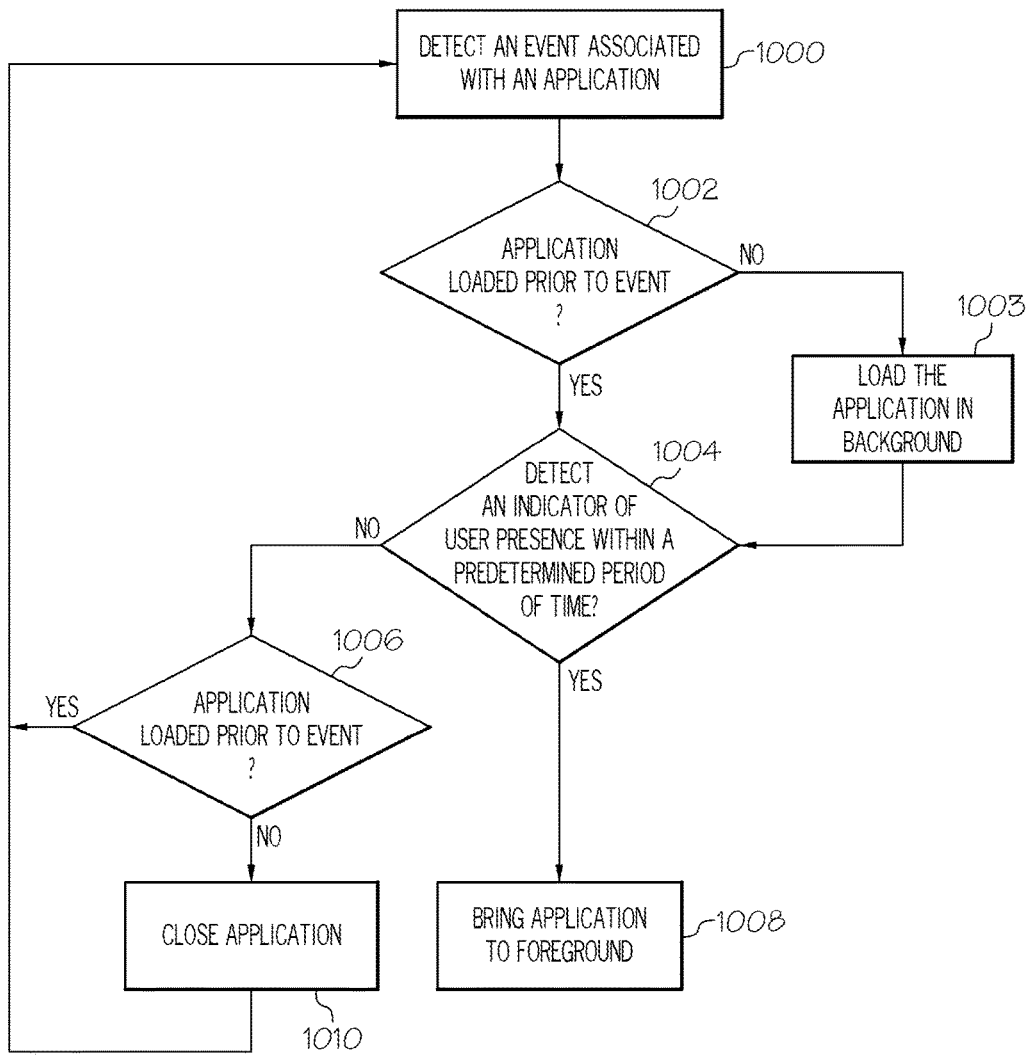
FIG. 9 is a flow diagram of other example computer executable instructions for launching an application on an electronic device.

Referring to FIG. 9, another example set of computer executable and/or processor implemented instructions is provided for launching an application associated with an event, on an electronic device 100. In this example application, at 1000, an event associated with at least one application is detected. At 1002, if the application associated with the event has not already been loaded on the electronic device 100 prior to the event, the application is loaded in the background at 1003. At 1004, if an indicator of user presence is detected within a predetermined period of time, then the application is brought to the foreground at 1008. Otherwise, if the application was not loaded prior to the event, the application is closed at 1010 and the instructions can then be repeated, starting back at 1000.

Similarly to 900, 904 and 908, in an example configuration of the application launcher 548, the event detector 800, user presence detector 808 and launching module 808 may implement 1000, 1004 and 1008, respectively (FIG. 7).

At 1002, a determination is made as to whether the application associated with the event has been loaded on the electronic device 100 prior to the event. If not, the application associated with the event is loaded in the background at 1003. In an example configuration of the application launcher 548, the launching module 808 may implement 1002 and 1003 (FIG. 7).

As mentioned above, loading the application in the background prior to detecting an indicator of user presence at 1004 enables the electronic device 100 to start loading an application sooner, thus reducing the wait time for a user to use the application. The savings in loading time may be greater when an event is associated with multiple applications. The ability to load the applications associated with an event immediately after detecting the event may enable the electronic device 100 to complete loading of all the applications before an indicator of user presence is detected. In such cases, once an indicator of user presence is detected at 1004, the applications will only need to be brought to the foreground, which can take considerably less time than loading the applications, to give the appearance that the electronic device 100 has provided a near instantaneous response to the indicator of user presence.

If an indicator of user presence is not detected within a predetermined period of time, at 1006, a determination is made as to whether the application(s) associated with the event was already loaded on the electronic device 100 prior to detecting the event. If the application(s) was not already loaded prior to the event, the application(s) loaded in the background is closed at 1010 to restore the electronic device 100 to its prior state. In an example configuration of the application launcher 548, the launching module 808 may implement 1006 and 1010 (FIG. 7).

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the spirit of the invention or inventions. For instance, the steps may be performed in a differing order, or steps may be added, deleted, or modified.

Although the above has been described with reference to certain specific examples, various modifications thereof will be apparent to those skilled in the art as outlined in the appended claims.

The invention claimed is:

1. A method of operating an electronic device to automatically load an application, the method comprising:
   generating, automatically at a processor, statistical information based on tracking proximities of a plurality of past accesses of an application on a device and events detected by the device;
   selecting, based on the statistical information, the application as an application with a greatest probability of being accessed by a user within a time proximity of an event, wherein the event is defined by one or more operating environment criteria associated with launching the application;
   determining, at the processor, an association between the event and the application based on statistical information regarding a user's launching of the application in proximity to a particular time of day over a plurality of days;

detecting, based on and subsequent to the determining the association, an occurrence of the event;

in response to detecting the occurrence of the event and based on the association, automatically loading the application into a background of the device, wherein the loading the application into the background of the device is independent of a present user command to load the application;

receiving, at the processor within a predetermined period of time after the occurrence of the event, an indication of user presence; and based on loading the application and receiving the indication of user presence within the predetermined period of time after the occurrence of the event, bringing the application into a foreground of the device.

2. The method of claim 1, wherein the one or more operating environment criteria comprises an operating mode of the device.

3. The method of claim 1, wherein the determining the association comprises: associating a calendar event with the application, and wherein the event is an occurrence of the calendar event.

4. The method of claim 1, wherein the determining the association comprises identifying, based on statistical information regarding a plurality of past operations of the device, a temporal correlation between the event and a subsequent use of the application.

5. The method of claim 1, wherein the event comprises a respective occurrence of an alarm associated with a time of day, and the determining the association is based on statistical information regarding the user's launching of the application within the time proximity of occurrences of the alarm.

6. The method of claim 1, further comprising: detecting, based on the determining, a second occurrence of the event; in response to detecting the second occurrence of the event, loading the application into a background of the device; monitoring, at the processor, for receipt of a second indication of user presence within the predetermined period of time after the second occurrence of the event; and based on loading the application and not receiving the second indication of user presence, closing the application.

7. The method of claim 1, wherein the determining the association comprises: determining a particular type of notification alert is an indication of receipt of a message to be processed by the application, and wherein the event is the particular type of notification alert.

8. The method of claim 1, wherein the event comprises an alarm occurring while the electronic device is operating in a bedside mode.

9. The method of claim 8, wherein receiving the indication of user presence comprises detecting a user input to turn off the alarm.

10. A device, comprising:
a processor;
a memory coupled to the processor, the processor configured to:
automatically generate, statistical information based on tracking proximities of a plurality of past accesses of an application on a device and events detected by the device;
selecting, based on the statistical information, the application as an application with a greatest probability of being accessed by a user based within a time proximity of an event, wherein the event is defined by one or more operating environment criteria associated with launching the application;

determine, based on the statistical information, an association between the event and the application based on statistical information regarding a user's launching of the application in proximity to a particular time of day over a plurality of days;

detect, based on and subsequent to a determination of the association, an occurrence of the event;

in response to a detection of the occurrence of the event and based on the association, load the application into a background of the device automatically and independently of a present user command to load the application;

receive, within a predetermined period of time after the occurrence of the event, an indication of user presence; and based on loading the application and receiving the indication of user presence within the predetermined period of time after the occurrence of the event, bring the application into a foreground of the device.

11. The device of claim 10, wherein the one or more operating environment criteria comprises an operating mode of the device.

12. The device of claim 10, wherein the processor determines the association by at least: associating a calendar event with the application, and wherein the event is an occurrence of the calendar event.

13. The device of claim 10, wherein the processor determines the association by at least identifying, based on statistical information regarding a plurality of past operations of the device, a temporal correlation between the event and a subsequent use of the application.

14. The device of claim 10, wherein the event comprises a respective occurrence of an alarm associated with a time of day, and the processor determines the association based on statistical information regarding the user's launching of the application within the time proximity of occurrences of the alarm.

15. The device of claim 10, the processor being further configured to: detect, based on a determination of the association, a second occurrence of the event; in response to a detection of the second occurrence of the event, load the application into a background of the device; monitor for receipt of a second indication of user presence within the predetermined period of time after the second occurrence of the event; and based on loading the application and not receiving the second indication of user presence, close the application.

16. The device of claim 10, wherein the processor determines the association by at least: determining a particular type of receipt notification is an indication of a message to be processed by the application, and wherein the event is the particular type of receipt notification.

17. A computer storage media having computer readable program code embodied therewith, the computer readable program code comprising instructions for:
generating, automatically at a processor, statistical information based on tracking proximities of a plurality of past accesses of an application on a device and events detected by the device;
selecting, based on the statistical information, the application as an application with a greatest probability of being accessed by a user based within a time proximity of an event, wherein the event is defined by one or more operating environment criteria associated with launching the application;

determining, at the processor based on the statistical information, an association between the event and the application based on statistical information regarding a user's launching of the application in proximity to a particular time of day over a plurality of days;

detecting, based on and subsequent to the determining the association, an occurrence of the event;

in response to detecting the occurrence of the event and based on the association, automatically loading the application into a background of the device, wherein the loading the application into the background of the device is independent of a present user command to load the application;

receiving, at the processor within a predetermined period of time after the occurrence of the event, an indication of user presence; and based on loading the application and receiving the indication of user presence within the predetermined period of time after the occurrence of the event, bringing the application into a foreground of the device.

18. The computer storage media of claim 17, wherein the one or more operating environment criteria comprises an operating mode of the device.

19. The computer storage media of claim 17, wherein the determining the association comprises identifying, based on statistical information regarding a plurality of past operations of the device, a temporal correlation between the event and a subsequent use of the application.

20. The computer storage media of claim 17, wherein the event comprises a respective occurrence of an alarm associated with a time of day, and the determining the association is based on statistical information regarding the user's launching of the application within the time proximity of occurrences of the alarm.

* * * * *